United States Patent
Bates et al.

(10) Patent No.: US 10,843,512 B2
(45) Date of Patent: Nov. 24, 2020

(54) BRAKE PAD WEAR SENSOR WITH WIRELESS DATA TRANSMISSION

(71) Applicant: Robert Bosch GmbH, Stuttgart (DE)

(72) Inventors: Andrew Bates, Ann Arbor, MI (US); Andreas Kurz, Bietigheim (DE); Walter Heinrich, Novi, MI (US); Michael Roelleke, Leonberg-Hoefingen (DE); Florin Gruianu, Northville, MI (US); Marian Keck, Plymouth, MI (US); Matache Rusu, Macomb, MI (US)

(73) Assignees: Robert Bosch LLC, Broadview, IL (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/331,485

(22) PCT Filed: Sep. 8, 2017

(86) PCT No.: PCT/EP2017/072640
§ 371 (c)(1),
(2) Date: Mar. 7, 2019

(87) PCT Pub. No.: WO2018/050564
PCT Pub. Date: Mar. 22, 2018

(65) Prior Publication Data
US 2019/0217671 A1    Jul. 18, 2019

Related U.S. Application Data

(60) Provisional application No. 62/394,401, filed on Sep. 14, 2016.

(51) Int. Cl.
*B60C 23/04* (2006.01)
*F16D 66/02* (2006.01)
*F16D 66/00* (2006.01)

(52) U.S. Cl.
CPC ............ *B60C 23/041* (2013.01); *B60C 23/04* (2013.01); *B60C 23/0408* (2013.01);
(Continued)

(58) Field of Classification Search
CPC .......................... B60C 23/041; F16D 66/021; F16D 2066/001
See application file for complete search history.

(56) References Cited

U.S. PATENT DOCUMENTS 5,848,672 A * 12/1998 Brearley ................. F16D 65/18
188/1.11 L
2005/0285569 A1* 12/2005 Rao ..................... B60C 23/0411
320/128
(Continued)

FOREIGN PATENT DOCUMENTS

| DE | 10352268 | 6/2005 |
|----|----------|--------|
| DE | 102010050284 | 5/2012 |

(Continued)

OTHER PUBLICATIONS

Kubba et al, "A Comprehensive Study on Technologies of Tyre Monitoring Systems and Possible Energy Solutions", Sensors, vol. 14. 2014, pp. 10306-10345; doi:10.3390/s140610308.
(Continued)

*Primary Examiner* — Qutbuddin Ghulamali
(74) *Attorney, Agent, or Firm* — Kelly McGlashen; Maginot, Moore & Beck LLC

(57) ABSTRACT

A vehicle wheel monitoring device includes a tire pressure monitoring unit, a tire pressure sensor unit disposed at a wheel of the vehicle and a brake pad wear sensor unit disposed at a wheel of the vehicle. The brake pad wear sensor unit includes a brake pad wear sensor and a wireless transmitter configured to receive the signal emitted from the brake pad wear sensor and wirelessly transmit it to the tire pressure monitoring unit. An energy harvesting device is
(Continued)

configured to convert energy derived from an external source into electrical power, and to provide the electrical power to the brake pad wear sensor unit and the transmitter. The brake pad wear sensor unit and the tire pressure sensor unit are monitored by the tire pressure monitoring unit.

19 Claims, 4 Drawing Sheets

(52) U.S. Cl.
CPC ........... *F16D 66/00* (2013.01); *F16D 66/021* (2013.01); *F16D 2066/001* (2013.01)

(56) References Cited

U.S. PATENT DOCUMENTS

| | | |
|---|---|---|
| 2006/0217914 A1 | 9/2006 | Bertness |
| 2007/0170912 A1* | 7/2007 | Kato ................... B60C 23/0408 324/160 |
| 2016/0215833 A1* | 7/2016 | Robert .................... F16D 61/00 |
| 2017/0082163 A1* | 3/2017 | Serra ........................ B60T 8/885 |

FOREIGN PATENT DOCUMENTS

| | | |
|---|---|---|
| WO | 2005080120 | 9/2005 |
| WO | 2016040763 | 3/2016 |

OTHER PUBLICATIONS

PCT International Search Report for PCT/EP2017/072640.

\* cited by examiner

BRAKE PAD WEAR SENSOR WITH WIRELESS DATA TRANSMISSION

CROSS-REFERENCE TO RELATED APPLICATIONS

This application is a 35 U.S.C. § 371 National Stage Application of PCT/EP2017/072640, filed on Sep. 8, 2017, which claims the benefit of U.S. Provisional Application No. 62/394,401, filed on Sep. 14, 2016, the disclosures of which are herein incorporated by reference in their entirety.

BACKGROUND

1. Field of the Invention

The present invention relates to a vehicle wheel monitoring device for a vehicle that includes a tire pressure sensor disposed at a wheel of the vehicle, a brake pad wear sensor disposed at a wheel of the vehicle, and tire pressure monitoring unit disposed in the vehicle at a location remote from wheels of the vehicle that monitors and controls the sensors.

2. Description of the Related Art

To ensure passenger safety, vehicles include many types of sensor systems that monitor the condition of various vehicle components and systems. For example, it is important to monitor brake pad thickness. Although brake pads wear slowly, it is critical for proper brake operation to maintain a minimum brake pad thickness. In some vehicles, brake pad wear is detected using a sacrificial brake pad wear sensor that is mounted adjacent the brake pad on a carrier in such a way that it contacts a brake disc in tandem with the brake pad, and wears away in parallel with the brake pad. The brake pad sensor is connected by a cable to an electronic control unit that determines the resistivity of the sensor, which in turn corresponds to the thickness of the brake pad. The cable is used to connect the brake pad sensor to the electronics associated with the brake pad sensor, including the electronic control unit, due to the high temperature environment in the vicinity of the brake pad.

SUMMARY

In some aspects, a vehicle wheel monitoring device includes a tire pressure monitoring unit disposed in the vehicle at a location remote from wheels of the vehicle, a tire pressure sensor unit disposed at at least one wheel of the vehicle and a brake pad wear sensor unit disposed at at least one wheel of the vehicle. The brake pad wear sensor unit includes a brake pad wear sensor that is configured to detect a wear condition of a brake pad of a wheel and emit a signal representing the wear condition, a wireless transmitter configured to receive the signal emitted from the brake pad wear sensor and wirelessly transmit it to a remote device, and a power supply, for example a battery or an energy harvesting device configured to convert energy derived from an external source into electrical power. The power supply is configured to provide the electrical power to the brake pad wear sensor unit and the transmitter. Each of the brake pad wear sensor units and the tire pressure sensor units of the vehicle are monitored and controlled by the tire pressure monitoring unit.

The vehicle wheel monitoring device may include one or more of the following features: The energy harvesting device produces electrical power by using thermal energy generated during friction-based brake operation of the brake pad. The energy harvesting device is in physical contact with a structure supporting the brake pad, and the thermal energy generated during friction-based brake operation of the brake pad is transferred to the energy harvesting device via thermal conduction through the brake pad and the structure supporting the brake pad. The wireless transmitter is remote from the brake pad, and the brake pad wear sensor is electrically connected to the wireless transmitter via an electrically conductive wire harness. The energy harvesting device is a thermoelectric energy harvester that comprises a first ceramic plate having a first outward-facing surface and an opposed first inward-facing surface, a second ceramic plate having a second outward-facing surface and an opposed second inward-facing surface, and p-type semiconductor elements and n-type semiconductor elements disposed between the first layer and the second layer. The p-type semiconductor elements and the n-type semiconductor elements are arranged in an array in which the p-type semiconductor elements alternate with the n-type semiconductor elements and a series electrical circuit is formed between the p-type semiconductor elements and the n-type semiconductor elements of the array. The first ceramic plate and the second ceramic plate are arranged in a stack such that the first and second inward-facing surfaces face the p-type semiconductor elements and the n-type semiconductor elements, and when the first outward-facing surface is at a higher temperature than the second outward-facing surface, a current is generated within the circuit. The brake pad wear sensor unit comprises an electronics unit configured to provide signal acquisition and signal processing of the signal emitted from the brake pad wear sensor, and the wireless transmitter is configured to transmit output from the electronics unit to the tire pressure monitoring unit. The output from the electronics unit includes a signal corresponding to a wear condition of the brake pad and an identifier uniquely identifying the brake pad wear sensor. The electronics unit includes an application specific integrated circuit that is operable with the tire pressure monitoring unit. The tire pressure sensor unit comprises an electronics unit configured to provide signal acquisition and signal processing of the signal emitted from the tire pressure sensor, and the electronics unit of the tire pressure sensor unit includes an application specific integrated circuit that operates in the same manner as the application specific integrated circuit of the brake pad wear sensor unit. The energy harvesting device is a device configured to detect vibration and convert the detected vibration into electrical power.

In some aspects, a sensor system includes a sensor unit configured to detect a physical property and emit a signal representing the physical property; a wireless transmitter configured to receive the signal emitted from the sensor unit and wirelessly transmit it to a remote device; and an energy harvesting device configured to convert thermal energy derived from an external source into electrical power, and to provide the electrical power to the sensor unit and the transmitter.

The sensor system may include one or more of the following features: The sensor unit is a brake pad sensor configured to detect a wear condition of a brake pad of a vehicle, and the energy harvesting device produces electrical power by using thermal energy generated during friction-based brake operation of the brake pad. The energy harvesting device is in physical contact with a structure supporting the brake pad, and the thermal energy generated during friction-based brake operation of the brake pad is transferred to the energy harvesting device via thermal conduction through the brake pad and the structure supporting the brake pad. The wireless transmitter is remote from the brake pad, and the sensor unit is electrically connected to the wireless transmitter via an electrically conductive wire. The sensor system is connected to a monitoring and control network of the motor vehicle. The energy harvesting device is a thermoelectric energy harvester that comprises a first ceramic plate having a first outward-facing surface and an opposed first inward-facing surface, a second ceramic plate having a second outward-facing surface and an opposed second inward-facing surface, and p-type semiconductor elements and n-type semiconductor elements disposed between the first layer and the second layer. The p-type semiconductor elements and the n-type semiconductor elements are arranged in an array in which the p-type semiconductor elements alternate with the n-type semiconductor elements and a series electrical circuit is formed between the p-type semiconductor elements and the n-type semiconductor elements of the array. The first ceramic plate and the second ceramic plate are arranged in a stack such that the first and second inward-facing surfaces face the p-type semiconductor elements and the n-type semiconductor elements, and when the first outward-facing surface is at a higher temperature than the second outward-facing surface, a current is generated within the circuit. The sensor system includes an electronics unit configured to provide signal acquisition and signal processing of the signal emitted from the sensor unit, and a transmitter configured to transmit output from the electronics unit to the remote device. The remote device is a tire pressure monitoring unit. The electronics unit includes an application specific integrated circuit operable with the tire pressure monitoring unit.

In some embodiments, a vehicle wheel monitoring device includes a tire pressure monitoring unit disposed in the vehicle at a location remote from wheels of the vehicle; a tire pressure sensor unit disposed at a wheel of the vehicle; and a brake pad wear sensor unit disposed at a wheel of the vehicle.

The brake pad wear sensor unit includes a brake pad wear sensor that is configured to detect an amount of wear of a brake pad of a wheel and emit a signal representing the wear of a brake pad; sensor electronics including a controller and a wireless transmitter configured to receive the signal emitted from the sensor unit and wirelessly transmit it to a remote device; and an energy harvesting device configured to convert thermal energy into electrical power, the energy harvesting device configured to provide electrical power to the sensor unit and the transmitter. In some embodiments, the brake pad wear sensor unit is formed as a single, integrated unit for example by packaging all components of the brake pad wear sensor unit together in a single housing that is positioned at the brake pad. In other embodiments, the brake pad wear sensor and the energy harvesting device are positioned at the brake pad, and the sensor electronics are positioned at a location remote from the brake pad. In this embodiment, the brake pad wear sensor and the energy harvesting device are connected to the sensor electronics via an electrically conductive wire.

Each of the brake pad wear sensor units and the tire pressure sensor units of the vehicle are monitored and controlled by the tire pressure monitoring unit. To this end, the sensor electronics used within the brake pad wear sensor unit include some components that are identical to those provided in the tire pressure sensor unit. Use of the same sensor electronics within both the brake pad wear sensor unit and the tire pressure sensor unit reduces the number of parts required for manufacture, thus simplifying manufacture and reducing costs.

Moreover, since the brake pad wear sensor unit uses the same sensor electronics as the tire pressure sensor unit, the tire pressure monitoring unit that is used to monitor the tire pressure sensors can also be used to monitor the brake pad wear sensors, avoiding duplication of monitoring systems within the vehicle, which in turn reduces vehicle complexity and further reduces manufacturing costs.

In some embodiments, the brake pad sensor is powered using a thermoelectric energy harvester, and communicates with a remote monitoring system via wireless connection that is also powered by the thermoelectric energy harvester. This arrangement can be compared to some conventional brake pad sensor systems in which a cable is used to provide power to the brake pad sensor and to connect the brake pad sensor to a monitoring system. Since the brake pad sensor is powered by the thermoelectric energy harvester and communicates wirelessly with the monitoring system, the cable can be omitted whereby the system is simplified and has a smaller footprint within the vehicle.

Use of a thermoelectric energy harvester is advantageous relative to some other types of energy harvesters, including for example vibrational and kinematic energy harvesters that can be relatively complex and may include moving parts.

The thermoelectric energy harvester takes advantage of the presence of a thermal gradient between a location at the brake pad and the vicinity of the brake pad which occurs during a braking operation. Typically, substantial thermal energy is generated within a brake system during a braking operation. For example, during a braking operation in which brake pads are urged against a vehicle wheel brake disc, temperatures in the vicinity of the brake pad can reach 300 degrees Celsius. This can be compared to temperatures in the vicinity of the brake pad of 100 degrees Celsius to 150 degrees Celsius during vehicle operation while the brakes are not operated and the brake pads are spaced apart from the brake disc.

Energy harvesters in general, and the thermoelectric energy harvester described herein, provide a very small amount of power, and thus are typically used for low-energy electronics. Larger voltage outputs are possible by serially electrically connecting many junctions within the thermoelectric energy harvester. Moreover, typical power densities available from thermoelectric energy harvesting devices are highly dependent upon the specific application, which in turn may affect, for example, the harvester's size and/or the selection of the materials used to form the harvester. In the case of brake pads, wear occurs very slowly and thus brake pad thickness determinations can be made relatively infrequently (on a time scale of hours, days or longer) while still maintaining a sufficient vigilance of monitoring to ensure the safe operation of the brakes. This relatively long time frame allows the power generated by the thermoelectric energy harvester to be accumulated in a power storage device such as a capacitor, super capacitor or battery. In the illustrated embodiment, a capacitor is used to accumulate power generated in the thermoelectric energy harvester that provides an energy spike to the components of the brake pad wear sensor unit when charge within the capacitor reaches a predetermined amount.

DETAILED DESCRIPTION

Figure 1:
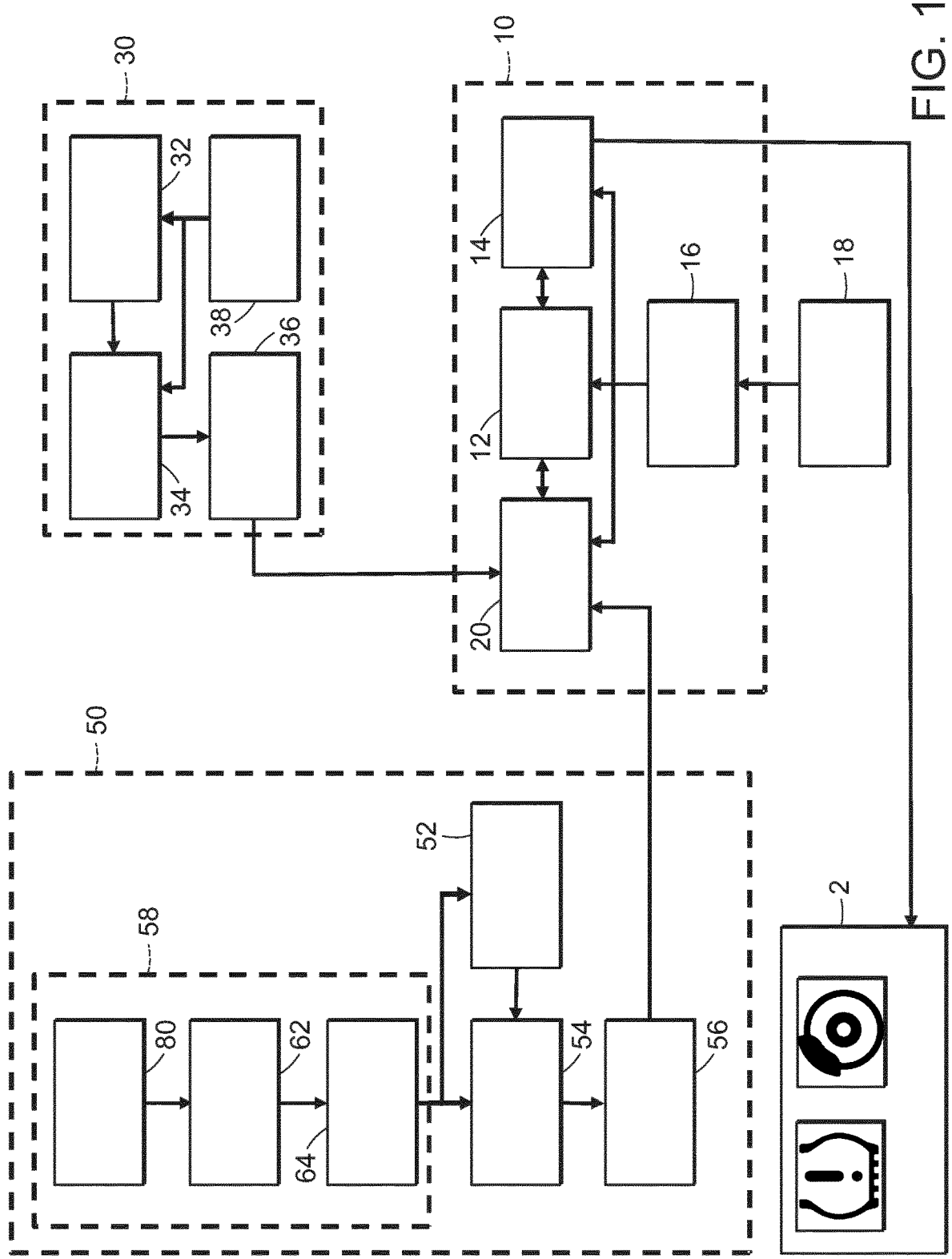
FIG. 1 is schematic diagram of a vehicle wheel monitoring device that includes a tire pressure monitoring unit that communicates wirelessly with a tire pressure sensor unit and a brake pad wear sensor unit.
Figure 2:
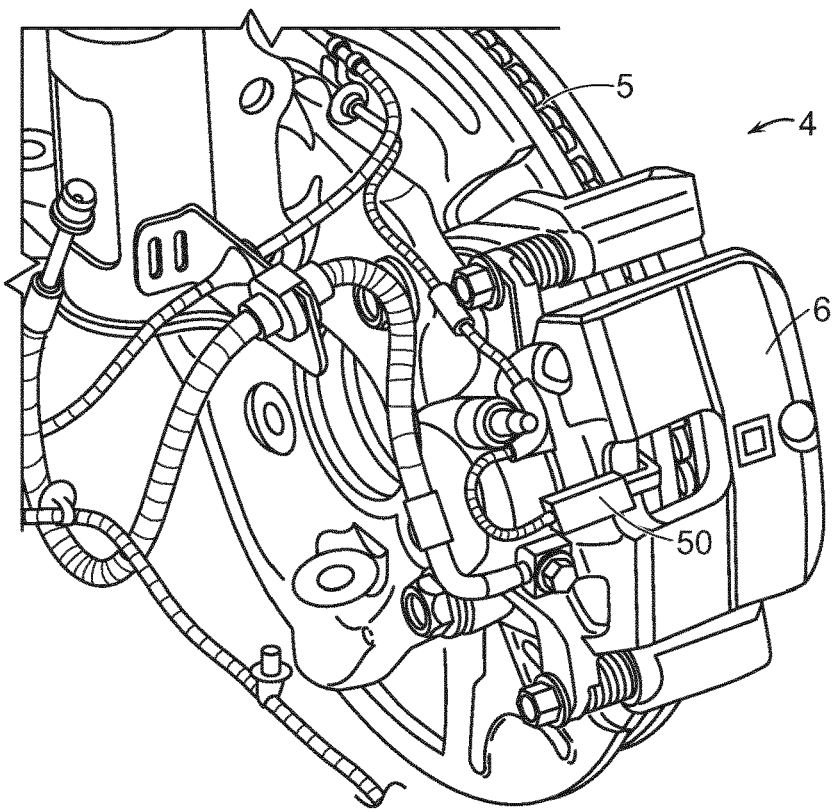
FIG. 2 is a perspective view of a vehicle disc brake including a brake pad wear sensor unit mounted on the brake pad caliper.
Figure 3:
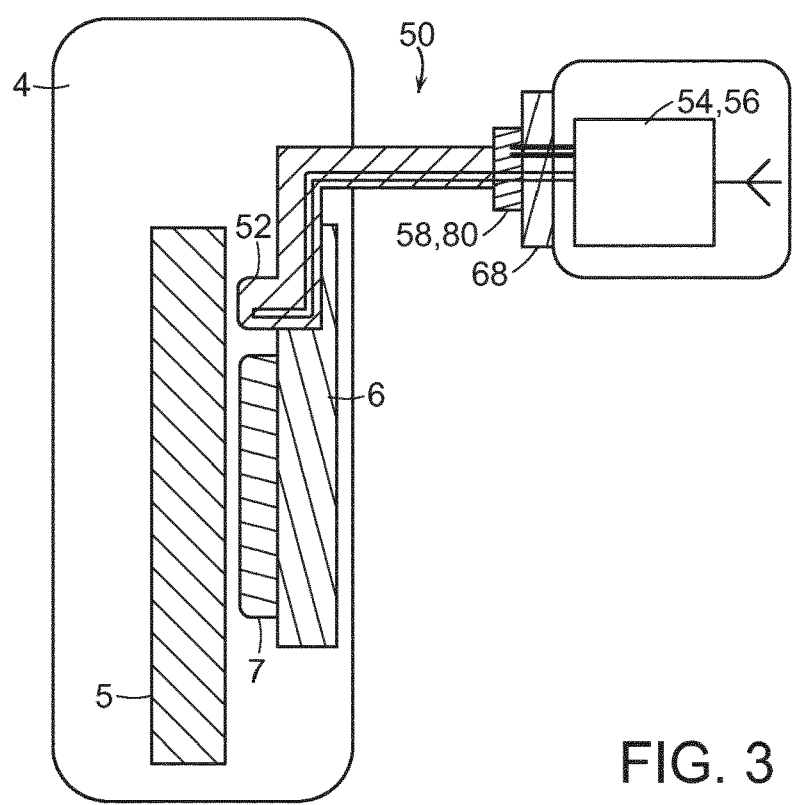
FIG. 3 is a schematic diagram of the brake pad wear sensor unit of FIG. 2.

Referring to FIGS. 1-3, a vehicle (not shown) is equipped with disc brakes 4 to achieve vehicle braking. Each disc brake 4 includes calipers 6 that are used to squeeze a pair of brake pads 7 against a brake disc 5 that is connected to a wheel axle (not shown) order to create friction that retards the rotation of the wheel axle, either to reduce its rotational speed or to hold it stationary. In some disc brake systems, a caliper 6 is mounted on each side of a brake disc 5, and a brake pad 7 is mounted on each caliper 6 so as to face the brake disc 5. When there is no active braking, the calipers 6 and brake pads 7 are spaced apart from the brake disc 5, permitting it to rotate freely. During a braking operation, the calipers 6 are moved toward each other so that the brake pads 7 are pressed against the brake disc 5. Friction between the brake pads 7 and the brake disc 5 causes the brake disc 5 and the attached wheel (not shown) to slow or stop.

The vehicle includes a wheel monitoring device 1 that monitors and controls a condition of each wheel. For example, each wheel includes a tire pressure sensor unit 30 that monitors tire pressure and wirelessly transmits information to the wheel monitoring device 1 identifying the wheel and indicating the tire pressure. In addition, each wheel includes a brake pad wear sensor unit 50 that monitors the wear of the brake pad 7 and wirelessly transmits information to the wheel monitoring device 1 identifying the wheel and indicating the amount of brake pad wear, as discussed further below.

The wheel monitoring device 1 includes a tire pressure monitoring unit 10, the tire pressure sensor units 30 and the brake pad wear sensor units 50. The tire pressure monitoring unit 10 includes a tire pressure monitoring unit (TPMU) controller 14 that sends and receives signals from a transceiver 20 via an amplifier/analog-to-digital (AD) converter unit 12. The TPMU controller 14, the transceiver 20 and amplifier/AD converter unit 12 are powered by a power management unit 16, which in turn is powered by the vehicle battery 18. The power management unit 16 may include, for example, a voltage regulator that adjusts (e.g., reduces) the voltage provided by the vehicle battery 18 to a level appropriate for the sensor unit electronics. The TPMU controller 14 analyses the information received from the tire pressure sensor units 30 and the brake pad wear sensor units 50 and may provide information to the vehicle operator regarding the wheel conditions, for example by displaying condition information on a vehicle display 2. In some embodiments, a warning signal (audible, hepatic or other appropriate signal) may be provided to the vehicle operator in situations where the tire pressure is dangerously low and/or the brake pad is dangerously worn.

The tire pressure monitoring unit 10 may be generally centrally located in the vehicle, that is, it may be disposed at a location distant from the wheels, and may be part of a vehicle information system. Each of the tire pressure sensor units 30 and the brake pad wear sensor units 50 communicate wirelessly with the tire pressure monitoring unit 10. As discussed below, identical application specific integrated circuits (ASICs) are used within the control electronics of both the brake pad wear sensor units 50 and the tire pressure sensor units 30, and thus the controller 14 of the tire pressure monitoring unit 10 can receive and process signals from both the tire pressure sensor units 30 and the brake pad wear sensor units 50 in the same manner.

Each tire pressure monitoring unit 30 includes a tire pressure sensor 32, sensor electronics including a controller 34, and a high frequency transmitter 36. In the illustrated embodiment, the controller 34 is part of an application specific integrated circuit (ASIC) that also includes read only memory (ROM), flash memory, and other ancillary components. The tire pressure monitoring unit 30 also includes a power source 38 that provides power to the tire pressure sensor 32 and the controller 34. In the illustrated embodiment, the power source is a battery.

A tire pressure monitoring unit 30 is provided for each wheel of the vehicle. For example, the tire pressure monitoring unit 30 may be disposed inside the wheel so as to be surrounded by the tire, and may be mounted on an inner portion of the tire air valve stem. The controller 34 receives the signal emitted from the tire pressure sensor 32, determines the tire pressure condition of the wheel and provides this information along with a wheel identifier to the wireless transmitter 36. The wireless transmitter 36 transmits this information to the tire pressure monitoring unit 10, and if appropriate, the tire pressure monitoring unit 10 can provide an alert to an operator of the vehicle. The alert can be made via an indicator (i.e., a light, a sound, or haptic feedback), indicating the corresponding tire pressure condition.

Each brake pad wear sensor unit 50 includes a brake pad wear sensor 52, sensor electronics including a controller 54, and a high frequency transmitter 56. In the illustrated embodiment, the controller 34 is part of an ASIC that also includes read only memory (ROM), flash memory and other ancillary components. The ASIC used in the brake pad wear sensor unit 50 may be identical to the ASIC used in the tire pressure monitoring unit 30. The brake pad wear sensor unit 50 also includes a power source 58 that provides power to the brake pad wear sensor 52 and the controller 54. Each of these components will now be described in more detail.

The brake pad wear sensor 52 detects the brake pad wear condition and is designed to wear along with the brake pad 7. For example, the brake pad wear sensor 52 includes an abradable component such as an abradable wire loop (not shown) that is either embedded in the brake pad 7 or clipped on a backing plate of the brake pad 7. The abradable component is electrically connected to the controller 54. When the brake pad 7 is reduced to a predetermined thickness due to wear, the abradable component wears with the brake pad 7, and a change in resistance in the brake pad wear sensor 52 occurs. The controller 54 detects the change in resistance and thereby determines that the brake pad 7 has worn to the position of the abradable component, whereby a wear stage corresponding to a thickness of the brake pad 7 is determined. The brake pad wear sensor 52 may contain either a single abradable wire loop for single-stage wear detection or multiple abradable loops for multi-stage wear detection. Regardless of whether the configuration is single-stage or the multistage, the controller 54 receives the signal emitted from the brake pad wear sensor 52, determines the wear condition of the brake pad 7 and provides this information along with a brake identifier to the wireless transmitter 56. The wireless transmitter 56 transmits this information to the tire pressure monitoring unit 10, and if appropriate, the tire pressure monitoring unit 10 can provide an alert to an operator of the vehicle via an indicator (i.e., a light, a sound, or haptic feedback), indicating the corresponding stage of wear of the brake pad 7. The indicator may be a different type depending on which stage of wear is detected by the controller 54.

Each brake pad wear sensor unit includes a dedicated power source 58. The power source 58 is an energy harvesting device that is configured to convert energy derived from an external source into electrical power, and to provide the electrical power to the brake pad wear sensor 52 and the sensor electronics including the controller 54 and the transmitter 56.

Figure 4:
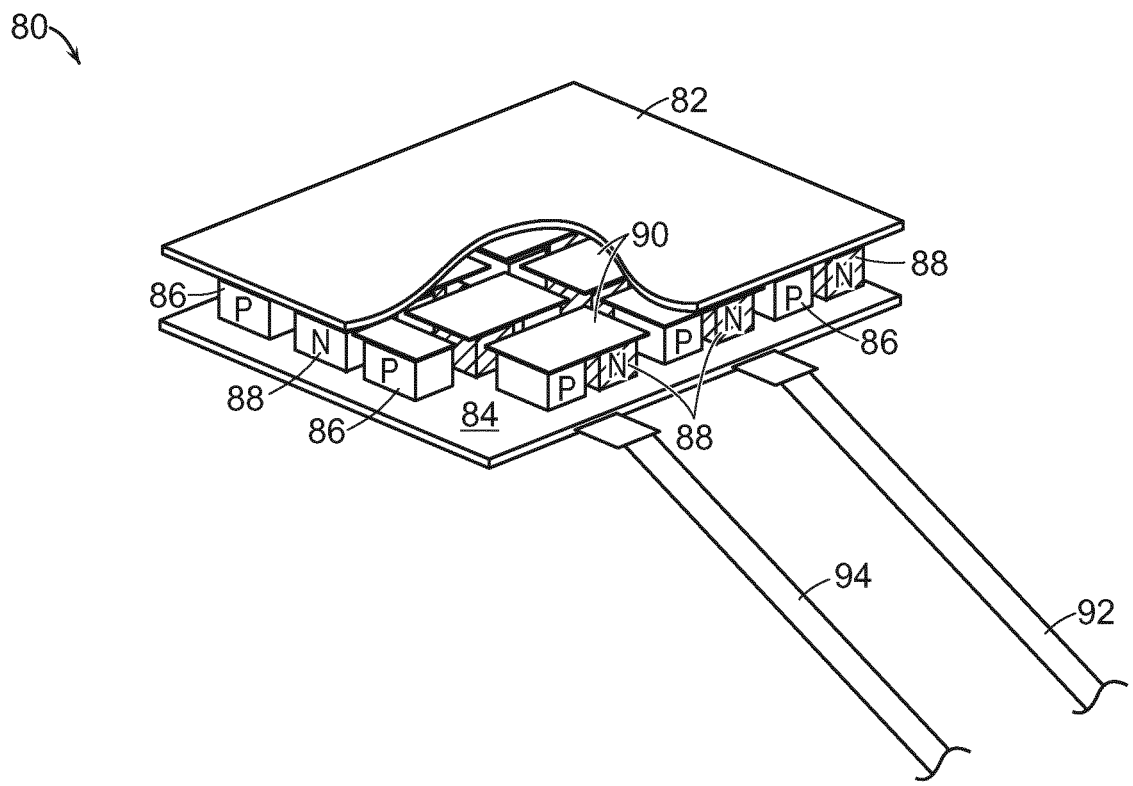
FIG. 4 is a partially cut-away perspective view of the thermoelectric energy harvester used to power the brake pad wear sensor of FIG. 1.
Figure 5:
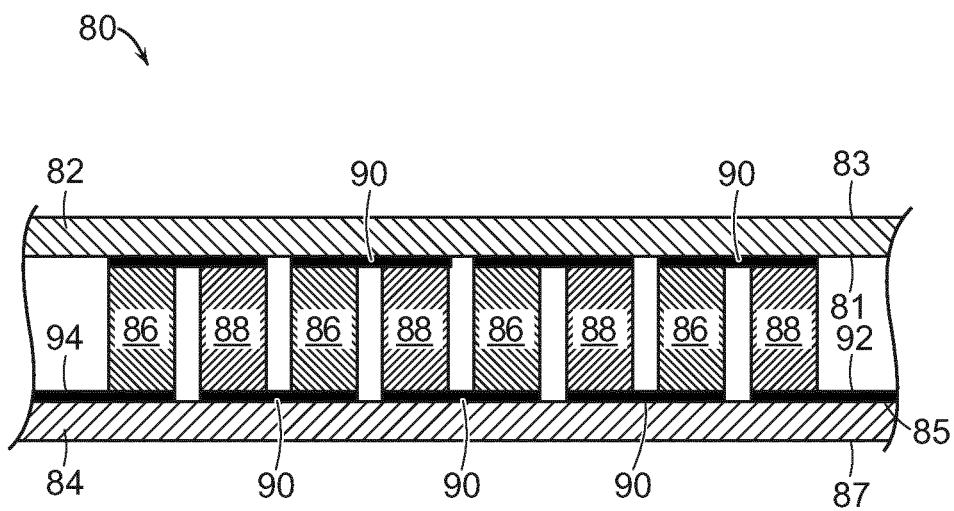
FIG. 5 is a cross-sectional view of the thermoelectric energy harvester of FIG. 4.

Referring to FIGS. 4 and 5, in the illustrated embodiment, the energy harvesting device is a thermoelectric energy harvester 80 that produces electrical power by using thermal energy generated during friction-based brake operation of the brake pad 7. The thermoelectric energy harvester 80 includes a first ceramic plate 82 having a first inward-facing surface 81 and an opposed first outward-facing surface 83. The thermoelectric energy harvester 80 includes a second ceramic plate 84 that is stacked with the first ceramic plate 82. The second ceramic plate 84 has a second inward-facing surface 85 and an opposed second outward-facing surface 87. In addition, the thermoelectric energy harvester 80 includes semiconductor materials sandwiched between the first ceramic plate 82 and the second ceramic plate 84. In particular, p-type semiconductor elements 86 and n-type semiconductor elements 88 are arranged in a two-dimensional array between the first ceramic plate 82 and the second ceramic plate 84 such that the p-type semiconductor elements 86 alternate with the n-type semiconductor elements 88 in both rows and columns of the array. In addition, adjacent ones of the p-type semiconductor 86 elements and the n-type semiconductor elements 88 of the array are electrically connected using individual electrically conductive plates 90 in such a way that a serial electrical circuit is formed between individual elements 86, 88 of the array. A direct electrical current is generated within the circuit when the first outward-facing surface 83 is at a different temperature than the second outward-facing surface 85. A positive lead 92 is electrically connected to the outermost element at one end of the serial electrical circuit, and a negative lead 94 is electrically connected to the outermost element at the opposed end of the serial electrical circuit, whereby the current generated within the thermoelectric energy harvester 80 can be collected and used.

The electrical current generated across each individual p- and n-type semiconductor element 86, 88 is very small. In addition, despite formation of the serial connection between the individual p- and n-type semiconductor element 86, 88, the accumulated charge provided by the thermoelectric energy harvester 80 during a single braking operation is not sufficient to power the sensor electronics of the brake pad wear sensor unit 50. To address this, the thermoelectric energy harvester 80 also includes an energy storage device such as a capacitor 64 that is connected to the serial electrical circuit via a direct current-to-direct current (DC-DC) converter 62. The capacitor 64 and DC-DC converter are included in the sensor electronics of the brake pad wear sensor unit 50. In use, each time a braking event occurs, the electrical charge generated in the thermoelectric energy harvester 80 is stored in the capacitor 64. The charge within the capacitor 64 accumulates over time with each braking event. When sufficient charge is reached within the capacitor 64, as determined by the properties of the capacitor 64, the capacitor 64 discharges current to the sensor electronics. The discharge provides power to the sensor electronics and permits a signal corresponding to the brake pad wear condition to be transmitted to the tire pressure monitoring unit 10.

Referring again to FIGS. 2 and 3, the brake pad wear sensor unit 50 is formed as a single, integrated unit in which the brake pad wear sensor 52 is disposed at one end of the brake pad wear sensor unit 50, the sensor electronics (including the controller 54, the transmitter 56, the capacitor 64, etc.) are disposed at the opposed end of the brake pad wear sensor unit 50, and the thermoelectric harvester 80 resides between the brake pad wear sensor 52 and the sensor electronics.

A brake pad wear sensor unit 50 is provided for each disc brake 4 of the vehicle. In the illustrated embodiment, only one break pad sensor unit 50 is provided per disc brake 4 (e.g., a brake disc 5 with two calipers 6 has only one sensor unit 50). The brake pad wear sensor 52 is supported on the caliper 6 such that the brake pad wear sensor 52 is adjacent to the brake pad 7 and faces the brake disc 5. The thermoelectric energy harvester 80 is supported on the brake pad wear sensor 52 on a side of the brake pad wear sensor 52 that faces away from the brake disc 5. Heat generated within the disc brake 4 during a braking operation is thermally conducted through the caliper 6 and/or the brake pad wear sensor 52 to one side (for example, to the first ceramic plate 82) of the thermoelectric energy harvester 80. Thus, in this example, the first ceramic plate 82 provides the hot side of the thermoelectric energy harvester 80. The second ceramic plate 84, disposed on a side of the thermoelectric energy harvester 80 facing away from the brake pad wear sensor 52, is exposed to the ambient air and provides the cold side of the thermoelectric energy harvester. Optionally, as shown in the illustrated embodiment, the temperature gradient between the first and second ceramic plates 82, 84 may be enhanced by providing a heat sink in the form of a cooling plate 68 on the second ceramic plate 84. The cooling plate 68 abuts and is thermally connected to the second ceramic plate outward-facing surface 87. The cooling plate 68 may be configured to passively or actively cool the thermoelectric energy harvester cold side. In addition, the sensor electronics are disposed on the cold side. In some embodiments, the sensor electronics may be somewhat thermally shielded from the hot side by the presence of the thermoelectric energy harvester 80 and the cooling plate 68 disposed therebetween.

Figure 6:
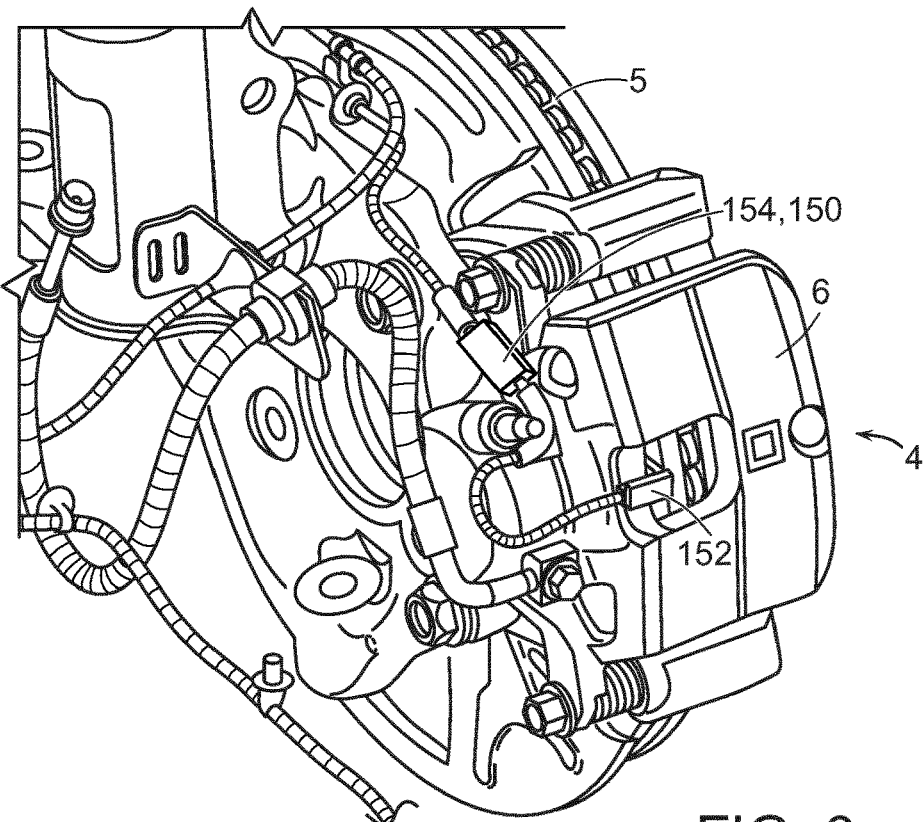
FIG. 6 is a perspective view of a vehicle disc brake including an alternative embodiment brake pad wear sensor unit mounted on the brake pad caliper.
Figure 7:
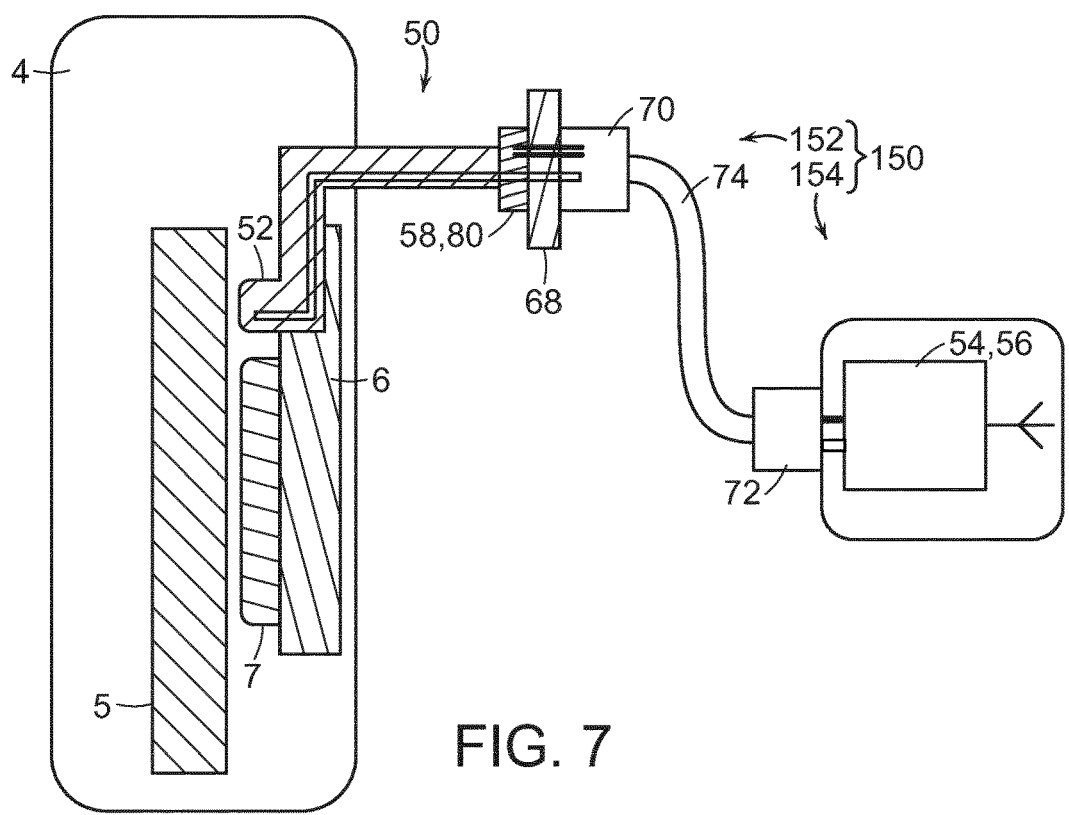
FIG. 7 is a schematic diagram of the brake pad wear sensor unit of FIG. 6.

Referring to FIGS. 6 and 7, an alternative embodiment brake pad wear sensor unit 150 is formed as a two separate subunits 152, 154 that are electrically connected via an electrically conductive wire harness 74. The first subunit 152 includes the brake pad wear sensor 52 and the thermoelectric energy harvester 80. In the first subunit 152, the brake pad wear sensor 52 is supported on the caliper 6 such that the brake pad wear sensor 52 is adjacent to the brake pad 7 and faces the brake disc 5. The thermoelectric energy harvester 80 is supported on the brake pad wear sensor 52 on a side of the brake pad wear sensor 52 that faces away from the brake disc 5. Heat generated within the disc brake 4 during a braking operation is thermally conducted through the caliper 6 and/or the brake pad wear sensor 52 to one side (for example, to the first ceramic plate 82) of the thermoelectric energy harvester 80.

The second subunit 154 includes the sensor electronics, including the controller 54, the transmitter 56, the capacitor 64, etc. The second subunit 154 is supported on the disc brake 4 at a location that is spaced apart from the brake pad. For example, in the illustrated embodiment, the second subunit 154 is disposed on an outer surface of the caliper assembly. By spacing the sensor electronics apart from the brake pad 7, negative effects of heat generated during a braking operation on the sensor electronics is reduced. The wire harness 74 that electrically connects the first subunit 152 to the second subunit 154 includes the positive and negative leads 92, 94 from the thermoelectric energy harvester 80 and an output lead (not shown) from the bread pad wear sensor 52.

Although the wheel monitoring device 1 is described as monitoring the tire pressure sensor unit 30 and the brake pad sensor unit 50, the wheel monitoring device 1 is not limited to monitoring these sensors and other types of sensors and/or sensor units may be substituted. Moreover, the wheel monitoring device 1 may monitor other sensors (not shown) in the vicinity of the wheel in addition to the tire pressure sensor unit 30 and the brake pad sensor unit 50. Examples of other sensors include, but are not limited to, wheel rotational speed sensors, temperature sensors, etc.

In the illustrated embodiments, the power source 58 is a thermoelectric energy harvester 80. However, the power source 58 is not limited to a thermoelectric energy harvester. For, example, the power source 58 may be another type of energy harvesting device such as a vibrational energy harvester that is configured to detect vibration and convert the detected vibration into electrical power. Moreover, the power source 58 is not limited to being an energy harvester, and may be another type of power source including, but not limited to, a battery.

The vehicle wheel monitoring system 1 can be used in any type of vehicle including but not limited to automobiles, trucks, tractors, trailers or any combination thereof.

In the illustrated embodiment, the brake pad wear sensor 52 is a sacrificial sensor that wears in parallel with the brake pad 7 in such a way that resistance within the sensor is changed. However, the brake pad wear sensor 52 is not limited to this type sacrificial sensor. Moreover, other types of sensors can be used to detect brake pad wear, for example optical sensors, capacitative sensors or other appropriate sensors.

Selective illustrative embodiments of the battery pack and battery pack housing are described above in some detail. It should be understood that only structures considered necessary for clarifying these devices have been described herein. Other conventional structures, and those of ancillary and auxiliary components of the battery pack system, are assumed to be known and understood by those skilled in the art. Moreover, while working examples of the battery pack and battery pack housing been described above, the battery pack and/or battery pack housing is not limited to the working examples described above, but various design alterations may be carried out without departing from the devices as set forth in the claims.

What is claimed is:

1. A vehicle wheel monitoring device comprising:
    a tire pressure monitoring unit disposed in the vehicle at a location remote from wheels of the vehicle;
    a tire pressure sensor unit disposed at at least one wheel of the vehicle; and
    a brake pad wear sensor unit disposed at at least one wheel of the vehicle, the brake pad wear sensor unit including
        a brake pad wear sensor that is configured to detect a wear condition of a brake pad of a wheel and emit a signal representing the wear condition;
        a wireless transmitter configured to receive the signal emitted from the brake pad wear sensor and wirelessly transmit it to a remote device; and
        a power supply configured to provide electrical power to the brake pad wear sensor unit and the transmitter,
    wherein each of the brake pad wear sensor units and the tire pressure sensor units of the vehicle are monitored and controlled by the tire pressure monitoring unit,
    the power supply is an energy harvesting device configured to convert energy derived from an external source into electrical power, and to provide the electrical power to the brake pad wear sensor unit and the transmitter,
        the energy harvesting device produces electrical power by using thermal energy generated during friction-based brake operation of the brake pad, and
        the energy harvesting device is in physical contact with a structure supporting the brake pad, and the thermal energy generated during friction-based brake operation of the brake pad is transferred to the energy harvesting device via thermal conduction through the brake pad and the structure supporting the brake pad.

2. The vehicle wheel monitoring device of claim 1, wherein the wireless transmitter is remote from the brake pad, and the brake pad wear sensor is electrically connected to the wireless transmitter via an electrically conductive wire harness.

3. The vehicle wheel monitoring device of claim 1, wherein the energy harvesting device is a thermoelectric energy harvester that comprises
    a first ceramic plate having a first outward-facing surface and an opposed first inward-facing surface,
    a second ceramic plate having a second outward-facing surface and an opposed second inward-facing surface, and
    p-type semiconductor elements and n-type semiconductor elements disposed between the first layer and the second layer, the p-type semiconductor elements and the n-type semiconductor elements arranged in an array in which the p-type semiconductor elements alternate with the n-type semiconductor elements and a series electrical circuit is formed between the p-type semiconductor elements and the n-type semiconductor elements of the array,
    wherein
        the first ceramic plate and the second ceramic plate are arranged in a stack such that the first and second inward-facing surfaces face the p-type semiconductor elements and the n-type semiconductor elements, and
        when the first outward-facing surface is at a higher temperature than the second outward-facing surface, a current is generated within the circuit.

4. The vehicle wheel monitoring device of claim 1, wherein the brake pad wear sensor unit comprises an electronics unit configured to provide signal acquisition and signal processing of the signal emitted from the brake pad wear sensor, and
    the wireless transmitter is configured to transmit output from the electronics unit to, the tire pressure monitoring unit.

5. The vehicle wheel monitoring device of claim 4, wherein the output from the electronics unit includes a signal corresponding to a wear condition of the brake pad and an identifier uniquely identifying the brake pad wear sensor.

6. The vehicle, wheel monitoring device of claim 4 wherein the electronics unit includes an application specific integrated circuit that is operable with the tire pressure monitoring unit.

7. The vehicle wheel monitoring device of claim 6 wherein the tire pressure sensor unit comprises an electronics unit configured to provide signal acquisition and signal processing of the signal emitted from the tire pressure sensor, and the electronics unit of the tire pressure sensor unit includes an application specific integrated circuit that operates in the same manner as the application specific integrated circuit of the brake pad wear sensor unit.

8. The vehicle wheel monitoring device of claim 1, wherein the energy harvesting device is a device configured to detect vibration and convert the detected vibration into electrical power.

9. A sensor system comprising:
a sensor unit configured to detect a physical property and emit a signal representing the physical property;
a wireless transmitter configured to receive the signal emitted from the sensor unit and wirelessly transmit it to a remote device; and
an energy harvesting device configured to convert thermal energy derived from an external source into electrical power, and to provide the electrical power to the sensor unit and the transmitter,
wherein
the sensor unit is a brake pad sensor configured to detect a wear condition of a brake pad of a vehicle; and
the energy harvesting device produces electrical power by using thermal energy generate during friction-based brake operation of the brake pad.

10. The sensor system of claim 9, Wherein the energy harvesting device is in physical contact with a structure supporting the brake pad, and the thermal energy generated during friction-based brake operation of the brake pad is transferred to the energy harvesting device via thermal conduction through the brake pad and the structure supporting the brake pad.

11. The sensor system of claim 9, Wherein the wireless transmitter is remote from the brake pad, and the sensor unit is electrically connected to the wireless transmitter via an electrically conductive wire.

12. The sensor system of claim 9, wherein the sensor system is connected to a monitoring and control network of the motor vehicle.

13. The sensor system of claim 9, wherein the energy harvesting device is a thermoelectric energy harvester that comprises
a first ceramic plate having a first outward-facing surface and an opposed first inward-facing surface,
a second ceramic plate having a second outward-facing surface and an opposed second inward-facing surface, and
p-type semiconductor elements and n-type semiconductor elements disposed between the first layer and the second layer, the p-type semiconductor elements and the n-type semiconductor elements arranged in an array in which the p-type semiconductor elements alternate with the n-type semiconductor elements and a series electrical circuit is formed between the p-type semiconductor elements and the n-type semiconductor elements of the array,
wherein
the first ceramic plate and the second ceramic plate are arranged in a stack such that the first and second inward-facing surfaces face the p-type semiconductor elements and the n-type semiconductor elements, and
when the first outward-facing surface is at a higher temperature than the second outward-facing surface, a current is generated within the circuit.

14. The sensor system of claim 9, comprising:
an electronics unit configured to provide signal acquisition and signal processing of the signal emitted from the sensor unit, and
a transmitter configured to transmit output from the electronics unit to the remote device.

15. The sensor system of claim 9, wherein the remote device is a tire pressure monitoring unit.

16. The sensor system of claim 15, wherein the electronics unit includes an application specific integrated circuit operable with the tire pressure monitoring unit.

17. A vehicle wheel monitoring device comprising:
a tire pressure monitoring unit disposed in the vehicle at a location remote from wheels of the vehicle;
a tire pressure sensor unit disposed at at least one wheel of the vehicle; and
a brake pad wear sensor unit disposed at at least one wheel of the vehicle, the brake pad wear sensor unit including
a brake pad wear sensor that is configured to detect a wear condition of a brake pad of a wheel and emit a signal representing the wear condition;
a wireless transmitter configured to receive the signal emitted from the brake pad wear sensor and wirelessly transmit it to a remote device; and
a power supply configured to provide electrical power to the brake pad wear sensor unit and the transmitter,
wherein each of the brake pad wear sensor units and the tire pressure sensor units of the vehicle are monitored and controlled by the tire pressure monitoring unit,
the power supply is an energy harvesting device configured to convert energy derived from an external source into electrical power, and to provide the electrical power to the brake pad wear sensor unit and the transmitter,
the energy harvesting device produces electrical power by using thermal energy generated during friction-based brake operation of the brake pad,
the energy harvesting device is in physical contact with a structure supporting the brake pad, and the thermal energy generated during friction-based brake operation of the brake pad is transferred to the energy harvesting device via thermal conduction through the brake pad and the structure supporting the brake pad, and
the wireless transmitter is remote from the brake pad, and the brake pad wear sensor is electrically connected to the wireless transmitter via an electrically conductive wire harness.

18. A vehicle wheel monitoring device comprising:
a tire pressure monitoring unit disposed in the vehicle at a location remote from wheels of the vehicle;
a tire pressure sensor unit disposed at at least one wheel of the vehicle; and
a brake pad wear sensor unit disposed at at least one wheel of the vehicle, the brake pad wear sensor unit including
a brake pad wear sensor that is configured to detect a wear condition of a brake pad of a wheel and emit a signal representing the wear condition;
a wireless transmitter configured to receive the signal emitted from the brake pad wear sensor and wirelessly transmit it to a remote device; and an energy harvesting device configured to convert energy derived from an external source into electrical power and to provide electrical power to the brake pad wear, sensor unit and the transmitter, wherein the energy harvesting device is a thermoelectric energy harvester that comprises a first ceramic plate having a first outward-facing surface and an opposed first inward-facing surface, a second ceramic plate having a second outward-facing surface and an opposed second inward-facing surface, and p-type semiconductor elements and n-type semiconductor elements disposed between the first layer and the second layer, the p-type semiconductor elements, and the n-type semiconductor elements arranged in an array in which the p-type semiconductor elements alternate with the n-type semiconductor elements and a series electrical circuit is formed between the p-type semiconductor elements and the n-type semiconductor elements of the array, and wherein the first ceramic plate and the second ceramic plate are arranged in a stack such that the first and second inward-facing surfaces face the p-type semiconductor elements and the n-type semiconductor elements, when the first outward-facing surface is at a higher temperature than the second outward-facing surface, a current is generated within the circuit, and each of the brake pad wear sensor units and the tire pressure sensor units of the vehicle are monitored and controlled by the tire pressure monitoring unit.

19. A vehicle wheel monitoring device comprising:

a tire pressure monitoring unit disposed in the vehicle at a location remote from wheels of the vehicle;

a tire pressure sensor unit disposed at at least one wheel of the vehicle; and a brake pad wear sensor unit disposed at at least one wheel of the vehicle, the brake pad wear sensor unit including a brake pad wear sensor that is configured to detect a wear condition of a brake pad of a wheel and emit a signal representing the wear condition;

a wireless transmitter configured to receive the signal emitted from the brake pad wear sensor and wirelessly transmit it to a remote device; and a power supply configured to provide electrical power to the brake pad wear sensor unit and the transmitter, wherein each of the brake pad wear sensor units and the tire pressure sensor units of the vehicle are monitored and controlled by the tire pressure monitoring unit, the brake pad wear sensor unit comprises an electronics unit configured to provide signal acquisition and signal processing of the signal emitted from the brake pad wear sensor, and the wireless transmitter is configured to transmit output from the electronics unit to the tire pressure monitoring unit.

* * * * *

UNITED STATES PATENT AND TRADEMARK OFFICE
CERTIFICATE OF CORRECTION

PATENT NO. : 10,843,512 B2
APPLICATION NO. : 16/331485
DATED : November 24, 2020
INVENTOR(S) : Bates et al.

Page 1 of 1

It is certified that error appears in the above-identified patent and that said Letters Patent is hereby corrected as shown below:

On the Title Page

In Column 2 the third line under the heading "OTHER PUBLICATIONS",
"doi: 10.3390/s140610308" should read --doi: 10.3390/s140610306--.

In the Claims

In Claim 4, at Column 10, Line 64: "unit to, the tire" should read --unit to the tire--.

In Claim 6, at Column 11, Line 4: "The vehicle, wheel monitoring device" should read --The vehicle wheel monitoring device--.

In Claim 9, at Column 11, Line 35: "thermal energy generate" should read --thermal energy generated--.

In Claim 18, at Column 13, Line 4: "brake pad wear, sensor unit" should read --brake pad wear sensor unit--.

In Claim 18, at Column 13, Lines 16-17: "the p-type semiconductor elements, and the n-type semiconductor elements" should read --the p-type semiconductor elements and the n-type semiconductor elements--.

Signed and Sealed this
Ninth Day of March, 2021

Drew Hirshfeld
*Performing the Functions and Duties of the
Under Secretary of Commerce for Intellectual Property and
Director of the United States Patent and Trademark Office*